United States Patent [19]

Yagami et al.

[11] Patent Number: 4,582,308
[45] Date of Patent: Apr. 15, 1986

[54] REAR BODY CONSTRUCTION OF TRUCK

[75] Inventors: Kouichi Yagami, Zamashi; Tsunehiro Kunimoto, Atsugi, both of Japan

[73] Assignee: Nissan Motor Co., Ltd., Yokohama, Japan

[21] Appl. No.: 590,079

[22] Filed: Mar. 15, 1984

[30] Foreign Application Priority Data

Mar. 30, 1983 [JP] Japan ............................. 58-46358[U]

[51] Int. Cl.$^4$ ................................................ B60P 1/00
[52] U.S. Cl. ........................................ 296/183; 296/10
[58] Field of Search ............... 296/183, 185, 186, 191, 296/193, 10, 13, 14; 403/322, 327, 166

[56] References Cited

U.S. PATENT DOCUMENTS 2,446,800 8/1948 Arrighi ................................ 296/183
3,889,814 6/1975 Rice ....................................... 296/3
4,328,988 5/1982 Patterson et al. ..................... 296/183

FOREIGN PATENT DOCUMENTS 955412 4/1964 United Kingdom ................... 296/10

Primary Examiner—Robert R. Song
Attorney, Agent, or Firm—Schwartz, Jeffery, Schwaab, Mack, Blumenthal & Evans

[57] ABSTRACT

A truck having a load platform for loading a load includes a rear body construction in which two rear side panels is formed at both sides of the platform. One of the rear side panels has a lowered portion the upper end of which is lower than the upper end of the rear side panel to allow easy loading and unloading of the load over the rear side panel. For preventing the falling off of the load from the lowered portion, there is provided a side bar removably installed across front and rear portions of the rear side panel so as to extend across the space above the lowered portion.

4 Claims, 8 Drawing Figures

FIG. 1
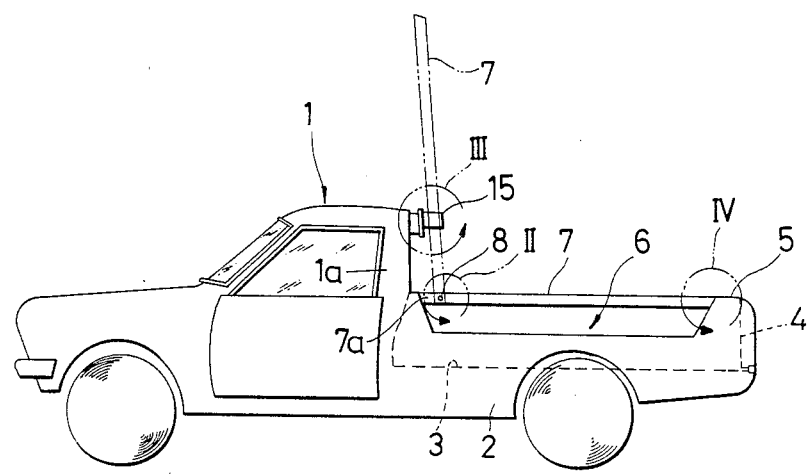
FIG. 2
FIG. 3
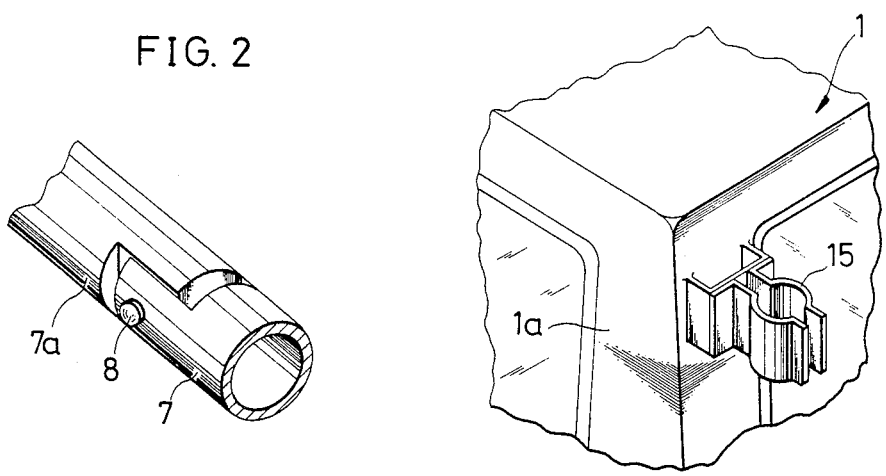

REAR BODY CONSTRUCTION OF TRUCK

BACKGROUND OF THE INVENTION

The present invention relates to a rear body of a truck, and more particularly to a body construction of a rear side portion of the truck.

In a truck, such as a pickup truck, in which both sides of a load platform are spaced apart with rear side panels, when loading and unloading from the side of the load platform, the loading or unloading has to be performed over above the rear side panel. This has extremely decreased the efficiency of loading and unloading. An attempt has been to overcome the problem discussed above by lowering the height of rear side panel, so that the loading and unloading operation from the side of the load platform may become easier. However, such a construction makes problems such as decrease in the safety of the transportation and decrease in the load capacity.

SUMMARY OF THE INVENTION

It is an object of the present invention to provide a rear body construction of a truck which is capable of increasing loading and unloading efficiency.

It is another object of the present invention to provide a rear body construction of a truck which is capable of securing the safety of the transportation of the load.

It is a further object of the present invention to provide a rear body construction of a truck which allows for easy mounting or dismounting of the operator on or from the load platform.

Briefly described, these and other objects of the present invention are accomplished by the provision of a rear body construction of a truck which comprises two rear side panels at least one of which has a lowered position being lower than the upper end of the rear side panel, and means for preventing the falling off of a load from the lowered portion after the load has been loaded. The preventing means comprises a side bar removably attached to the rear side panel so as to extend across the space above the lowered portion, and engagement means for releasably engaging the side bar with the rear side panel.

BRIEF DESCRIPTION OF THE DRAWING

These and other objects, features and advantages of the present invention will be more apparent from the following description of a preferred embodiment, taken in conjunction with the accompanying drawings, in which:

FIG. 1 is a side view of a truck provided with a rear body construction embodying the present invention;

FIG. 2 is an enlarged perspective view of the portion within the circular arrow II in FIG. 1;

FIG. 3 is an enlarged perspective view of the portion within the circular arrow III in FIG. 1;

DESCRIPTION OF THE PREFERRED EMBODIMENT

Figure 4:
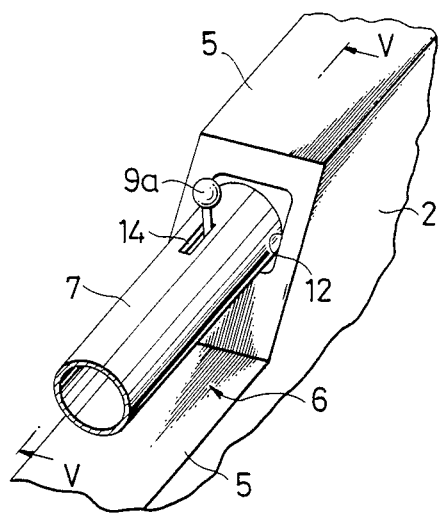
FIG. 4 is an enlarged prespective view of the portion IV in FIG. 1.
Figure 5:
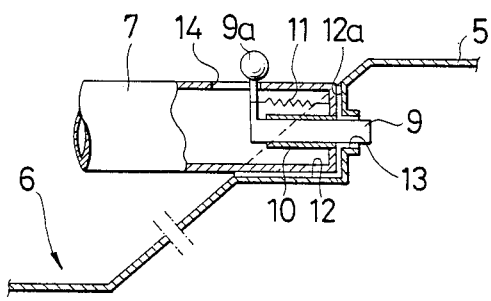
FIG. 5 is a sectional view taken along the line V—V in FIG. 4.

Referring now to FIGS. 1 through 5, a body 1 of a truck has a pair of rear side panels 2 which are spaced apart on both sides of a load platform 3, and a rear end panel 4 of the load platform 3. In one of the rear side panels 2, there is formed a lowered portion 6 at an intermediate portion of an upper rail 5 of the rear side panel 2, which is lower than the front and rear portions of the upper rail 5. At the above of the lowered portion 6, there is removably provided a side bar 7 which extends between the front and rear portions of the upper rail 5. One end of the side bar 7 is pivotally connected as at a pin 8 to a base portion 7a which is fixed to the front end of the upper rail 5, so that the side bar 7 can turn up and down against a base portion 7a. The other end of the side bar 7 has a lock pin 9 which pass through the end of the side bar 7, is slidably held by a guide 10, and further, is always forced towards the projecting direction by a set spring 11. The rear portion of the upper rail 5 is formed with a bar end receiving portion 12 which has an upright wall 12a formed with a lock hole 13. The lock pin 9 is engageable with the lock hole 13. Also, the lock pin 9 has an operating lever 9a which projects through a slit 14 formed at the upper surface of the side bar 7, so that the pulling operation of the operating lever 9a unlocks the lock pin 9. Further, at the upper back side of a rear pillar 1a of the truck, there is installed a bar holder 15 made of, for example, sheet spring material, etc., and the construction is made such that the side bar 7 is engaged by the bar holder 15 and is held up.

With the rear body construction described above, when loading or unloading operation is performed from the side of the platform 3, the lock pin 9 at the rear end of the side bar 7 is unlocked and the side bar is turned upwards and, as shown by broken line in FIG. 1, is engaged and held up by the bar holder 15. Thus, since the lowered portion 6 of the rear side panel 2 is opened, the load is loaded or unloaded at the lowered portion 6 which has a lower height from the ground. This means that the loading and unloading operation may be very easily performed.

Also, since the lowered portion 6 has a low height from the ground, at the time of loading or unloading operation, the operation can easily mount or dismount on or from the load platform 3 at the lowered portion 6. Further, the operator may utilize the side bar, which has been held up by the bar holder 15 as described previously, as a hand rail by gripping the side bar 7. As a result, the mounting and dismounting of the operator may be more easily made.

On the other hand, when the load has already been loaded on the load platform 3, as shown by a construction line in FIG. 1, the side bar 7 is turned down to its original state and its rear end is locked by lock pin 9. Then, the side bar 7 prevents the load from dropping off from the lowered portion, and can hold the load the same as a truck having a general rear side panel thereby providing for continued safety during transportation.

Figure 6:
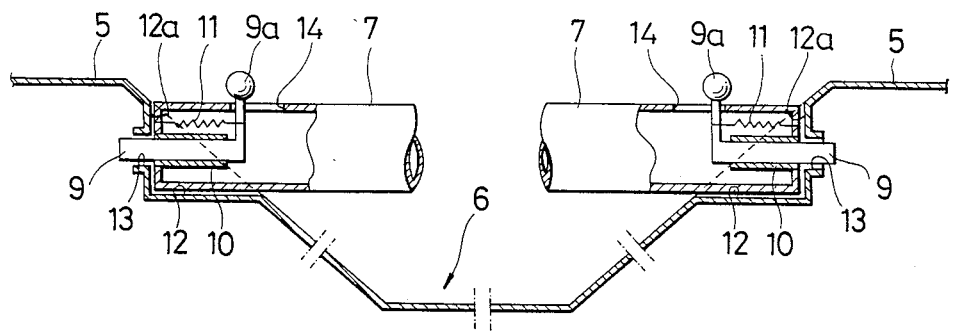
FIG. 6 is a sectional view of another embodiment of the present invention.

Referring to FIG. 6, there is shown another embodiment of the rear body construction, which is made so that the side bar 7 can be completely removed from the lowered portion 6. Both ends of the side bar 7 are provided with lock pin 9 which is same to the one described in the first embodiment. The construction is such that, by locking or unlocking of the lock pin 9, the whole side bar 7 is engaged with or disengaged from the lowered portion 6.

Figure 7:
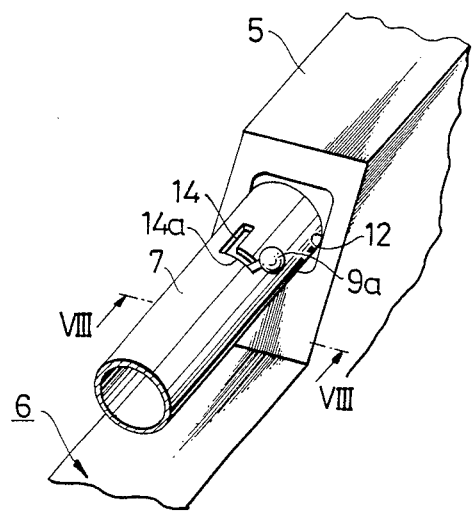
FIG. 7 is a perspective view showing the essential portions of the embodiment shown in FIG. 6.

In this embodiment, as shown in FIG. 7, at the slit 14 on the upper surface of the side bar 7, there is formed in the circumferential direction of the side bar 7 a slit 14a for use as a stopper. The operating lever 9a engaged into the slit 14a and thus the lock pin 9 is held inside the side bar end. Accordingly, the releasing operation of the side bar 7 is made easier, and also prevents the lock pin 9 from breakage and deformation when the side bar 7 is installed.

Figure 8:
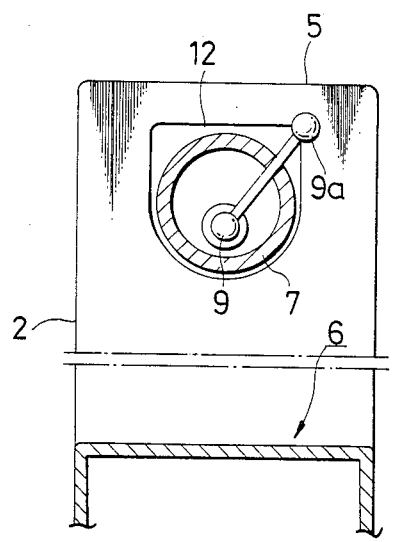
FIG. 8 is a sectional view taken along the line VIII—VIII in FIG. 7.

Also, as shown in FIG. 8, by offsetting the center of lock pin 9 against the center of the side bar 7, it is possible to prevent the rotational movement of the sie bar 7 in its installed state.

In summary, according to the present invention, the loading and unloading from the side of the load platform can be performed at a lowered portion of the rear side panel which has a lower height from the ground, thus the operation efficiency is greatly enhanced. Further, since the load can be securely held by the side bar which is removably installed at the above of the lowered portion, prevention is made for any probable accident of the load falling off from the lowered portion, and thus, effects a great practical advantage of securing the safety of the transportation of the load.

Various modifications will become possible for those skilled in the art after receiving the teachings of the present disclosure without departing from the scope thereof.

What is claimed is:

1. In a truck having a load platform for loading a load, a rear body construction, comprising:
   two rear side panels comprising an upper rail at the upper end of each of said panels and formed at both sides of the platform, at least one of said rear side panels having a lowered portion, the upper end of which is lower than the upper end of the rear side panel, said lowered portion being formed at an intermediate portion between front and rear portions of the upper rail; and
   means for preventing the displacement of the load from the lowered portion after the load has been loaded, said preventing means comprising a side bar removably attached to the rear side panel so as to extend across the space above the lowered portion from the front portion to the rear portion of the upper rail, and engagement means, for releasably engaging the side bar with the rear side panel, comprising a base portion fixed to the front portion of the upper rail, a pin which pivotally connects one end of the side bar to the base portion to allow free turning thereof up and down, a bar end receiving portion formed at a rear portion of the upper rail for receiving the other end of the side bar, and a lock pin provided at the other end of the side bar for removably engaging the other end of the side bar with the bar end receiving portion.

2. A rear body construction as claimed in claim 1, further comprising a bar holder being installed at an upper back side of a rear pillar of the truck for holding the side bar which is turned upwards about the pin.

3. A rear body construction as claimed in claim 2, in which the bar end receiving portion has an upright wall formed with a lock hole and in which the lock pin is slidably held in the side bar by a guide to pass through the other end of the side bar and is always forced towards the projecting direction by a set spring to engage with the lock hole, the lock pin having an operating lever which projects through a slit formed at the upper surface of the side bar so that the pulling operation of the operating lever unlocks the lock pin.

4. In a truck having a load platform for loading a load, a rear body construction, comprising:
   two rear side panels comprising an upper rail at the upper end of each of said panels and formed at both sides of the platform, at least one of said rear side panels having a lowered portion, the upper end of which is lower than the upper end of the rear side panel, said lowered portion being formed at an intermediate portion between front and rear portions of the upper rail; and
   means for preventing the displacement of the load from the lowered portion after the load has been loaded, said preventing means comprising a side bar removably attached to the rear side panel so as to extend across the space above the lowered portion from the front portion to the rear portion of the upper rail, and engagement means for releasably engaging the side bar with the rear side panel comprising two bar end receiving portions formed at the front and rear portions of the upper rail, respectively, and two lock pins provided at each end of the side bar for removably engaging both ends thereof with the bar end receiving portions, respectively, wherein, each of the bar end receiving portions has an upright wall formed with a lock hold and in which each of the lock pins is slidably held in the side bar by a guide to pass through the end of the sidebar and is always forced towards the projecting direction by a set spring to engage with the lock hole, the lock pin having an operating lever which projects through a slit formed at the upper surface of the side bar so that the pulling operation of the operating lever unlocks the lock pin.

* * * * *